3,328,321
CELLULAR POLYURETHANES PREPARED FROM POLYHYDROXY RESINOUS REACTION PRODUCTS OF AN AMINO-s-TRIAZINE AND AN ALKYLENE CARBONATE OR AN ALKYLENE OXIDE
Marco Wismer, 346 Forestwood Drive; Louis R. Le Bras, 3821 Hilltop Drive; and Rostyslaw Dowbenko, 517 Edgehill Drive, all of Gibsonia, Pa. 15044
No Drawing. Filed Jan. 27, 1966, Ser. No. 523,284
13 Claims. (Cl. 260—2.5)

This application is a continuation-in-part of copending application Ser. No. 270,796, filed April 5, 1963 (now abandoned).

This invention relates to novel resinous polyurethanes and particularly to cellular materials prepared therefrom. More specifically, it relates to novel polyurethane foams prepared from an organic polyisocyanate and a polyhydroxy resinous reaction product of an amino-s-triazine and a compound selected from the class consisting of an alkylene carbonate and an alkylene oxide.

Useful rigid polyurethane foams have heretofore been prepared by reacting a diisocyanate, such as tolylene diisocyanate, or mixtures of isomers of the same, with a polyhydroxyl-containing material, such as polyesters, polyether polyols, and the like. Such foams find utility as insulating materials, particularly when a gas-forming halohydrocarbon having a low thermal conductivity, such as trichlorofluoromethane, is used as a blowing agent, which becomes entrapped in the cells of the foam, thereby improving the insulating quality of the foam.

One problem which exists in rigid polyurethane foams, and particularly those containing a halohydrocarbon gas, is the diffusion of moisture from the atmosphere into the cells of the foam. This phenomenon causes the insulative properties of the foam to decrease. This is commonly referred to as k-factor drift. (The k-factor, that is, thermal conductivity, increases, thereby making the foam a better conductor of heat, which is an extremely undesirable characteristic in an insulating material.) The loss of insulative quality caused by moisture diffusion occurs fairly slowly; however, it is still a serious problem as polyurethane foams are widely used to insulate refrigerators, freezers, refrigerated trucks, refrigerated box cars, and the like, which have a useful lift of 10 to 15 years or longer. The serious nature of the problem can be realized when it is considered that a 50 percent increase in k-factor in the insulation enclosing a machine, such as a refrigerator, which may occur during the first few years of use, would cause a 50 percent increase in power consumption during the remaining years of its life.

Another undesirable result of moisture permeation into a polyurethane foam used for insulation is ultimate physical deterioration of the foam. In polyurethane foam used for insulating refrigerated equipment this deterioration can occur in several ways; (1) by freezing of the moisture which has diffused through the foam, thereby causing loss of adhesion to the substrate, and (2) physical deterioration of the foam because of moisture saturation, which occurs when the moisture diffuses through the foam and condenses in the foam contiguous to a cold surface. While the effect of moisture diffusion, or permeation is especially acute in polyurethane foams used for insulating refrigerated equipment, it is nonetheless a problem in polyurethane foams used for other purposes. For example, moisture permeation causes deterioration and loss of adhesion of polyurethane foams to the substrate in boats and similar items subjected to a humid atmosphere.

It has now been discovered that polyurethane resins, particularly cellular products, prepared from (a) an organic polyisocyanate, (b) a polyhydroxy resinous reaction product of an amino-s-triazine and an alkylene oxide or an alkylene carbonate, and (c) optionally, another active hydrogen containing material, have improved resistance to water vapor transmission. Improved resistance to water vapor transmission results whenever about 5 percent by weight up to about 100 percent by weight of the total polyhydroxy component is a polyhydroxy resinous reaction product of an amino-s-triazine and an alkylene oxide or an alkylene carbonate.

A further advantage of utilizing the polyhydroxy resinous reaction products of this invention to prepare polyurethane resins resides in the catalytic effect of such polyhydroxy amino-s-triazine resins. The catalyzation of the urethane reaction by these resins is especially advantageous inasmuch as the quantity of additional catalysts can be decreased as increasing amounts of the polyhydroxy amino-s-triazine resins are utilized as the active hydrogen containing component.

The preparation of novel polyurethane foams from polyhydroxy amino-s-triazine resins is accomplished by admixing, preferably with vigorous agitation, the polyhydroxy amino-s-triazine resin, to which an emulsifier and blowing agent has been added, with an organic polyisocyanate. The reaction takes place over a wide range of temperatures; however, the preferred temperatures for forming foams is about 60° F. to about 90° F. If water is utilized as the blowing agent, it is preferred to provide an excess of the organic polyisocyanate component inasmuch as water reacts with isocyanate groups to form carbon dioxide, which causes foaming, thereby reducing the number of isocyanate groups available to react with the reactive hydrogen component.

When novel polyurethane resins, including foams, are prepared from an organic polyisocyanate and a blend of a polyhydroxy amino-s-triazine resin and another hydrogen reactive component, such as a polyether polyol, wherein the polyhydroxy amino-s-triazine constitutes less than about 20 percent by weight of the total weight of the active hydrogen containing components, the addition of a small amount of catalyst, such as trimethylamine, may be required. It is preferred that additional catalyst be added to the active hydrogen containing component prior to admixing that component with the organic polyisocyanate component.

The quantity of additional catalyst utilized in the preparation of polyurethane resins and polyurethane foams from blends of active hydrogen containing components containing a polyhydroxy amino-s-triazine resin, depends upon the quantity of the polyhydroxy amino-s-triazine present. As mentioned hereinabove, when a blend of active hydrogen containing components contains at least 20 percent by weight of a polyhydroxy amino-s-triazine resin, the inclusion of additional catalysts is unnecessary. However, if extremely fast reaction is desired, a small amount of additional catalyst may be added. The quantity of additional catalyst which may be used varies dependent on the type of catalyst.

The quantities of emulsifier used in the preparation of the novel polyurethane foams of this invention is ordinarily from about 0.5 percent by weight to about 2.0 percent by weight based on the total weight of the active hydrogen containing component.

The quantity of blowing agent utilized is generally from about 0.4 to about 1.7 moles of water per mole of organic polyisocyanate used, and for halohydrocarbons, about 5 percent by weight to about 30 percent by weight of halocarbon based on the total weight of the reaction mixture. Of course, larger and smaller amounts may also be used.

The preparation of the novel polyurethane resins of this invention does not require a particular ratio of reactants, that is, either reactant may be used in excess, although usual processing techniques do not utilize quantities of either reactant in more than about 30 percent. However, if water is being used as a blowing agent in the preparation of foams, it may be desirable to use the organic polyisocyanate in quantities greater than 30 percent excess. Generally, approximately stoichiometric equivalents of the reactants are preferred, that is, one equivalent of an organic polyisocyanate is reacted with one equivalent of an active hydrogen containing component. For example, tolylene diisocyanate has an equivalent weight of 87, while a polyhydroxy amino-s-triazine having a hydroxyl number of 300 has an equivalent weight of 187 (56,000 divided by 300); therefore, 187 grams of that active hydrogen containing component would be utilized for every 87 grams of tolylene diisocyanate.

*The polyhydroxy amino-s-triazine resins*

The polyhydroxy reaction products of an amino-s-triazine and an alkylene carbonate are novel and the preparation thereof is more particularly described in copending application, Ser. No. 270,795, filed Apr. 5, 1963, now U.S. Patent 3,244,713. These resins result from the reaction of amino-s-triazines having the structure

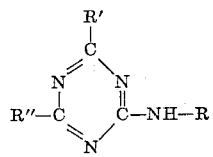

wherein R is hydrogen or an alkyl or aryl group, preferably containing 1 to 10 carbon atoms, and R' and R" represent hydrogen or an amine, alkylamino, alkyl or aryl group, wherein the hydrogen portion of any group preferably contains 1 to 10 carbon atoms, with an alkylene oxide, or an alkylene carbonate having the structure

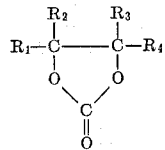

wherein $R_1$, $R_2$, $R_3$ and $R_4$ are hydrogen or alkyl, alkaryl or aryl groups, preferably containing 1 to 10 carbon atoms. The reaction is believed to take place substantially as follows, wherein melamine and ethylene carbonate are used for illustrative purposes:

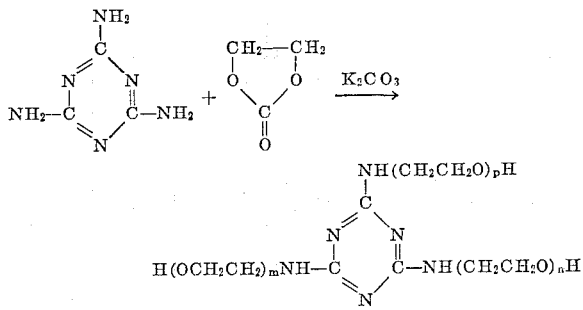

wherein either $m$, $n$ or $p$ may be a number from 1 to about 20 and the sum of $m+n+p$ is a number from about 3 to 40.

These resinous reaction products are simply and efficiently prepared, as for example, by heating an amino-s-triazine such as melamine, and an alkylene carbonate such as ethylene carbonate, in the presence of a base, at a temperature of bout 75° C. to about 250° C. They preferably have hydroxy values of about 150 or lower, to about 450 or higher.

A generalized structure for the reaction products of an amino-s-triazine and an alkylene carbonate or an alkylene oxide can be represented as follows:

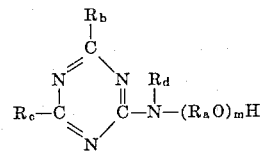

wherein $R_a$ is an alkylene group containing preferably from 1 to 6 carbon atoms, $R_b$ and $R_c$ are members of the class consisting of hydrogen, alkylamino, arylamino, alkyl, aryl and

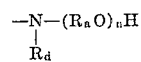

groups wherein $n$ is a number from 1 to 20 and wherein the hydrocarbon portion of any alkyl or aryl group preferably contains from 1 to 10 carbon atoms, $R_d$ is a member of the class consisting of hydrogen, alkyl, aryl and —$(R_aO)_pH$ groups wherein $p$ is a number from 1 to 20 and wherein any alkyl or aryl group preferably contains from 1 to 10 carbon atoms, $m$ is a number from 1 to 20, the sum of $m+n+p$ is a number from 1 to 40 and wherein $R_d$ is —$(R_aO)_pH$ whenever $R_b$ and $R_c$ are members of the class consisting of hydrogen, alkylamino, alkyl and aryl groups.

The ratio of one reactant to another is not critical and equimolar amounts or excesses of either reactant, may be effectively utilized. The characteristics of the reaction product vary somewhat with variations in the ratio of reactants; thus, for example, when only a slight excess of the alkylene carbonate reactant is utilized, a solid resin having a relatively low hydroxyl number is obtained, whereas a large excess of the same reactant produces an oily reaction product having a substantially higher hydroxyl number.

Equimolar quantities of the reactants or excesses of the alkylene carbonate reactant are generally preferred inasmuch as the alkylene carbonate reactant, which is liquid at the reaction temperature, acts as a solvent for the triazine thereby promoting effective contact between the reactants. If an excess of the triazine reactant is used, a solvent such as diethylene glycol dimethyl ether, dimethylformamide, dimethylacetamide, and the like, should be utilized to promote effective contact between the reactants.

The above reactions occur efficiently in the presence of about 0.10 percent to about 5.0 percent by weight of base, calculated on total weight of the reactants. Examples of utilizable bases include potassium carbonate, sodium carbonate, sodium hydroxide, pyridine, triethylene diamine, and the like.

The resinous reaction products of an amino-s-triazine and an alkylene oxide are also easily produced. These resins are similar to those produced from an amino-s-triazine and an alkylene carbonate described above. The reaction between an alkylene oxide and an amino-s-triazine is well known and occurs whenever the reactants are brought into effective contact with one another; preferably at temperatures of about 100° C. to about 200° C. and in the presence of a suitable base such as sodium hydroxide, potassium hydroxide, pyridine, and the like. The reaction is exothermic thereby necessitating the use of a cooling device to control the reaction temperature. Inasmuch as the boiling points of the common alkylene oxides, such as ethylene oxide, and propylene oxide, are very low, it is generally advantageous to conduct the reaction in a pressurized vessel. Also, the use of a solvent such as dimethylacetamide, is generally preferred.

The hydroxy containing amino-s-triazine resins produced from either an alkylene carbonate or an alkylene oxide are utilizable without further purification. These reactions can be conducted so as to produce resins with hydroxyl values as low as 150 or lower, and as high as 450 or higher. Those resins having a low hydroxyl number are generally solid while those having a higher hydroxyl value are generally liquid. The liquid resins are generally preferred as a component for producing polyurethane resins, especially foams; however, the solid resins can be effectively utilized by preheating them above their softening point immediately before contacting them with the other reactants.

The amino-s-triazines which can be used to produce useful hydroxyl containing resins by reaction with either an alkylene oxide or an alkylene carbonate are generally described by Formula 1 above and include the following:

Melamine
2,4-diamino-s-triazine
2-methyl-4,6-diamino-s-triazine
2-ethyl-4-methylamino-6-amino-s-triazine
2,4-dimethylamino-6-amino-s-triazine
2-ethylamino-4,6-diamino-s-triazine
2,4,6-trimethylamino-s-triazine
2,4-diphenyl-6-amino-s-triazine
2-phenylamino-4,6-diamino-s-triazine
2,4-diphenylamino-6-amino-s-triazine
2,4,6-triphenylamino-s-triazine and the like.

The preferred alkylene carbonate reactants are ethylene carbonate and propylene carbonate and the preferred alkylene oxide reactants are ethylene oxide, propylene oxide, and 1,2-butylene oxide, although other alkylene carbonates as well as other alkylene oxides, can be utilized with generally equivalent results.

As mentioned hereinabove, novel polyurethane resins, especially cellular products, can be produced from an organic polyisocyanate reacted with a hydroxy resinous material containing from about 5 percent by weight up to 100 percent by weight of a hydroxyl containing resinous reaction product of an amino-s-triazine and an alkylene oxide or an alkylene carbonate. Thus, in some instances, up to 95 percent of the component having a reactive hydrogen is composed of materials such as (1) polyethers of ethylene oxide, propylene oxide, and/or butylene oxide with polyols such as propylene glycol, trimethylolpropane, hexanetriol, glycerol, sorbitol, sucrose, and the like; (2) polyesters, for example, the reaction product of a dibasic acid such as adipic acid, maleic acid, phthalic acid, and the like, with polyols such as ethylene glycol, propylene glycol, diethylene glycol, trimethylolpropane, and the like; and (3) polyamides, including those prepared from dibasic acids such as succinic acid, fumaric acid, itaconic acid, terephthalic acid, sebacic acid, malonic acid, and the like, with a polyamine such as ethylene diamine, triethylene diamine, and the like, and hydroxylated vegetable oils such as castor oil.

Polyether polyols derived from sucrose and ethylene oxide and/or propylene oxide have found extensive utilization in the preparation of polyurethane foams. It has been discovered that the inclusion of about 5 percent by weight of the hydroxy reactive component of a hydroxyl containing resin prepared from an amino-s-triazine and an alkylene carbonate or an alkylene oxide improves the water vapor transmission resistance of a sucrose polyether polyol-polyurethane foam.

Although polyester-polyurethane foams have good water vapor transmission resistance the inclusion of as little as 5 percent by weight of the hydrogen reactive component of a hydroxyl containing resin prepared from an amino-s-triazine and an alkylene carbonate or an alkylene oxide reduces the amount of catalyst necessary to cause the urethane reaction to take place. As mentioned hereinabove, when 20 percent by weight of the hydroxyl reactive component consists of a hydroxylated amino-s-triazine resin, no additional catalyst is required to cause a reaction with an organic polyisocyanate.

*Organic polyisocyanate component*

The novel polyurethane resins of this invention can be prepared from any of the organic polyisocyanates ordinarily utilized in the preparation of polyurethane resins. Such organic polyisocyanates include:

2,4-tolylene diisocyanate
2,6-tolylene diisocyanate
diphenylmethane-4,4'-diisocyanate
m-phenylene diisocyanate
triphenylmethane triisocyanate
hexamethylene diisocyanate
naphthalene-1,5-diisocyanate
diphenyl diisocyanate
chlorophenyl-2,4-diisocyanate
triphenyl diisocyanate
ethylene diisocyanate and the like.

Mixtures of the organic polyisocyanates are widely used throughout the polyurethane resin industry and, for many applications, such mixtures are frequently preferred. Such mixtures include:

(a) An 80:20 mixture of the 2,4-isomer and 2,6-isomer of tolylene diisocyanate;

(b) A mixture of polyisocyanates having an average NCO content of 31 percent, an average equivalent weight of 135 and the following representative structure:

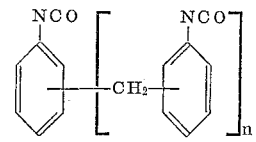

wherein $n$ has an average value of 1.5;

(c) A mixture of polyisocyanates having an average NCO equivalent of 135 and the following representative structure

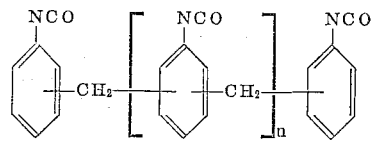

wherein $n$ is a number from 0 to 4, and has an average value of 0.5; and the like.

Frequently, because the direct reaction of isocyanate groups and active hydrogen groups is sometimes highly exothermic and effective mixing of the components is occasionally difficult, a prepolymer is preferably utilized to prepare polyurethane foams. Such prepolymers are generally prepared by reacting an excess of the polyisocyanate component with an active hydrogen containing substance although either component may be utilized in excess.

Subsequently, the prepolymer is cause to react with the balance of the component not used in excess so that the resulting copolymer is free of reactive groups.

*Catalysts*

As mentioned hereinabove, the use of hydroxylated amino-s-triazine resins of the type described above, in the preparation of polyurethane resins is advantageous inasmuch as these hydroxylated amino-s-triazine resins exhibit catalytic activity. Whenever the component containing an active hydrogen atom is comprised of about 20 percent by weight or more of the hydroxylated amino-s-triazine resin, the addition of catalysts is unnecessary. However, when less than 20 percent by weight of that resin is utilized, the use of an additional catalyst is preferred. Such catalysts include tertiary amines such as N-methyl morpholine, triethylamine, dimethylethanolamine, tetramethylethylenediamine, tetramethyl-1,4-butanediamine, triethylenediamine, and the like, and tin catalysts such as dibutyl tin dilaurate, stannous octoate, stannous oleate, and the like.

Emulsifying agents

The emulsification of an organic polyisocyanate with the other ingredients necessary for foam formation may be promoted by the addition of a suitable emulsifying agent. The novel products of this invention do not require special emulsifiers. Therefore, conventional emulsifying agents may be utilized. Appropriate emulsifiers include: Triton X–100, which is a condensate of an alkyl phenol and ethylene oxide; Tween 40, which is a polyoxyethylene sorbitan monopalmitateethylene oxide reaction product; Tween 601 which is a sorbitan monostearate-ethylene oxide reaction product; and polyoxyalkylene organo-silicone copolymers having the formula:

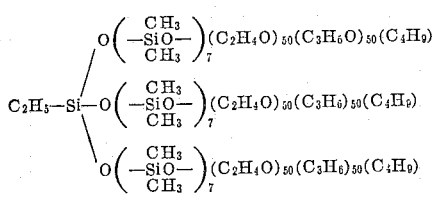

Blowing agents

A blowing agent, such as water of a low-boiling halohydrocarbon, may be utilized to form the novel foams of this invention. When water is utilized as the blowing agent, some additional polyisocyanate must be used inasmuch as water causes foam formation by reacting with isocyanate groups to form gaseous carbon dioxide. Water is usually added in an amount of about 0.25 percent to 10 percent by weight on the total of the resinous polyol component.

While water is an effective blowing agent, the utilization of a low-boiling halohydrocarbon is generally preferred in the preparation of foams having excellent insulative properties. Such halohydrocarbons include trichlorofluoromethane; 1,1,2-trichloro-1,2,2-trifluoroethane; sym-dichlorotetrafluoroethane; and the like. The halohydrocarbons, unlike water, do not participate in any reactions with any of the foam forming ingredients, but cause foaming by vaporization. The vaporization of the halohydrocarbon is accelerated by the heat evolved from the exothermic reaction between the isocyanate component and the resinous polyol component. The character of the foam, especially the density, can be regulated by utilization of a particular blowing agent. For most purposes, Refrigerant–11 (trichlorofluoromethane) has been found to be particularly desirable. The amount of halohydrocarbon blowing agent utilized is generally about 5 percent by weight to 30 percent by weight of the total foam forming components.

While the above description has emphasized the especially desirable properties of foams prepared from the novel polyurethane resins of this invention, it is not intended that the invention be limited solely thereto. The catalytic activity of the polyhydroxy amino-s-triazines described above, can be advantageously utilized in the preparation of polyurethane resins from any of the isocyanates and polyols described above. These resins can be used in any of the applications in which polyurethane resins have found utility, such as coatings, elastomers for cushions, tires, and the like, and rigid foams for insulation, packaging, boats, and the like.

The following examples illustrate in detail the preparation of the novel polyurethane resins of this invention. The examples are not intended to limit the invention, however, for there are, of course, numerous possible variations and modifications.

EXAMPLE I

A hydroxyl-containing amino-s-triazine resin was prepared from the following:

|  | Grams | Gram-moles |
|---|---|---|
| Benzoguanamine | 37.4 | 0.2 |
| Ethyleje carbonate | 37.0 | 0.42 |
| Potassium carbonate | 0.5 |  |

The above ingredients were admixed in a glass reaction vessel equipped with a stirrer, reflux condenser and thermometer.

The mixture was heated to a temperature of about 150° C. and maintained at that temperature for a period of about 5 hours. Carbon dioxide was evolved while the mixture was being heated, although the evolution diminished as the reaction continued.

The resulting mixture was distilled under vacuum at a temperature of about 150° C. for a period of 3 hours. Fifty-five (55) grams of a tan, solid, resinous material was obtained.

The product had a hydroxyl value of 221.2 and contained 24.52 percent nitrogen.

EXAMPLE II

In this example, 2 moles of sucrose were reacted with 20 moles of propylene oxide and 14 moles of ethylene oxide mixed together before addition to the sucrose. In conducting the reaction, the apparatus employed was an autoclave equipped with means for heating, means for cooling, an agitator, means for purging out the air with inert gas, and means for bubbling the alkylene oxide below the surface of the sucrose solution. The total charge employed was:

| | Parts by weight |
|---|---|
| Sucrose | 684 |
| Water | 140 |
| Sodium hydroxide | 10.25 |
| Premixed as a solution: | |
| Propylene oxide | 1162 |
| Ethylene oxide | 616 |

The sucrose and the water were mixed to provide a mixture containing 83 percent by weight of sucrose and 17 percent by weight of water. The sodium hydroxide was employed in an amount of 1.5 percent by weight based upon the sucrose.

The sucrose, water and caustic solution were preheated in the autoclave to 200° F. and the addition of the mixture of propylene oxide and ethylene oxide started. One half of the total charge of oxides was added over a period of about 3 hours and 7 minutes. The maximum pressure attained during the addition was 60 p.s.i. and the maximum temperature was 225° F.

The addition of the second half of the mixture of propylene oxide and ethylene oxide required 5 hours. The maximum pressure during this interval was 65 p.s.i. Whenever the pressure tended to go above this value, the addition of the mixture of oxides was interrupted until the pressure dropped below that value.

At the conclusion of the addition of the mixture of oxides, the pressure was about 50 p.s.i. and dropped to about 29 p.s.i. over a period of 80 minutes, and then became constant.

Stirring was continued for 1¾ hours without change of pressure, which was an indication of completion of the reaction. The product in an amount of 2457 parts by weight was drained from the autoclave. The theoretical yield is 2602 parts by weight.

The product was then neutralized by removing caustic from the solution with ion exchange resin until the pH was reduced to the neutral point. The ion exchange resin was evaporated from the product under vacuum and at a temperature of 80° C. to 90° C. Additional water was removed by azeotropic distillation with toluene. The net amount of product was 2202 parts by weight (84.6 percent of theoretical value). The theoretical hydroxyl value based upon 100 percent yield is 364. The actual hydroxyl vlaue was 450.3 The theoretical hydroxyl value based upon the yield is 417.

The color value was 3–4. The viscosity was 10,000 centipoises at 25° C. The final pH value was 3.4 and solids content was 94.4 percent.

The material contained 4.96 percent of volatile material, determined by heating the material at 200° C. under 5–10 millimeters of Hg. pressure for 30 minutes and measuring the loss by weight.

EXAMPLE III

A polyurethane foam was prepared by admixing 100 grams of a mixture of polyisocyanate having an average NCO content of 31 percent, an average equivalent weight of 135 and the following representative structure:

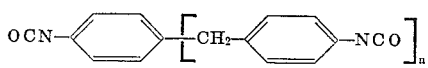

where $n$ has an average value of 1.5, with a mixture of:
 (a) 10 grams of a resinous hydroxy material prepared from benzoguanamine and propylene carbonate in the manner of Example I and having an OH value of 158.4 and a nitrogen content of 10.12 percent;
 (b) 82 grams of a resinous hydroxy material prepared from 1 mole of sucrose, 11 moles of propylene oxide and 4 moles ethylene oxide, in the manner of Example II, and having a hydroxyl number of about 460 and a viscosity of about 25,000 centipoises;
 (c) 1.0 grams of a polyoxyalkylene organosiloxane copolymer emulsifier having the formula:

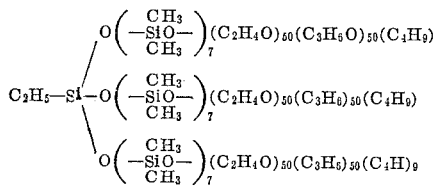

(d) milliliters of a 1:0.4 blend of dimethylethanolamine and triethylenediamine catalysts; and
 (e) 31 grams of trichlorofluoromethane.

The isocyanate component was vigorously blended with the other ingredients for about 25 seconds at about 70° F. The initial stage of foaming occurred about 10 seconds after the agitation was stopped and within an additional 20 seconds a foam having a strong gel had formed.

After curing for 68 hours at room temperature the foam was rigid, having a fine cell structure and a density of 2.16 pounds per cubic foot. Upon subjection of 200° F. temperature for 48 hours the foam remained hard, undistorted and free from internal splits.

The water vapor transmission character of the foam was tested by exposing one side of the foam to an atmosphere of 100 percent relative humidity and the other side of the foam to an atmosphere of 50 percent relative humidity. The water vapor transmission rate was 3.63 perm-inch.

The water absorptivity of the foam was 2.68 percent by weight. This was determined by immersing a sample of the foam in water for a period of 14 days and measuring the increased weights.

Foams prepared in the above manner utilizing a benzoguanamine-ethylene carbonate or melamine-ethylene carbonate reaction product as the additional resinous hydroxy containing material have comparable properties.

EXAMPLE IV

A hydroxyl-containing amino-s-triazine resin was prepared from the following:

|  | Grams | Gram-moles |
| --- | --- | --- |
| Benzoguanamine | 187.2 | 1.0 |
| Ethylene oxide | 440.0 | 10.0 |
| Dimethylacetamide | 1 250 |  |
| Powdered NaOH | 2.0 |  |

[1] Milliliters.

The above ingredients were charged into a heavy walled cylinder which had been thoroughly flushed with nitrogen. The cylinder was sealed securely, placed in an electric heating mantle and vibrated gently.

Heat was applied and the temperature of the reactor contents raised to 100° C. as measured by a thermocouple inside the cylinder. The reaction mixture exothermed at 240° C. Following the exotherm, the temperature fell sharply and heat was again applied to maintain the temperature of the reactor contents at 100° C. for an additional period of 8 hours.

The reactor was cooled and its contents discharged. The reaction mixture was distilled at 150° C. to remove dimethylacetamide. The resulting reaction product weighed 634 grams, had a nitrogen content of 11.24 percent and an OH value of 166.8.

EXAMPLE V

A sucrose polyol prepolymer was prepared from the following:
 (a) 21 parts by weight of a resinous hydroxy material prepared from 1 mole of sucrose, 11 moles propylene oxide, and 4 moles ethylene oxide, in the manner of Example II, and having a hydroxyl number of about 460 and a viscosity of about 25,000 centipoises; and
 (b) 79 parts by weight of toluene diisocyanate, which was a mixture of 80 percent of the 2,4-isomer and 20 percent of the 2,6-isomer.

The toluene diisocyanate ingredient was placed in a reaction vessel equipped with a stirrer, reflux condenser and thermometer, and heated to 60° C. under a dry air blanket.

The sucrose polyol ingredient was divided into three equal portions. As each portion was added the temperature rose exothermally to about 75° C.–80° C. The temperature of the reaction mixture was cooled to about 65° C. between additions. After the final addition of polyol the temperature of the reaction mixture was maintained at about 70° C. for about ½ hour. The product was cooled to 60° C. and filtered through a fine cheesecloth filter. The properties of this material were as follows:

| NCO equivalent | 140 |
| --- | --- |
| Viscosity _____cps | 1500 |
| Color | Amber |
| Weight per gallon _____lbs | 10.4 |

EXAMPLE VI

A polyurethane foam was prepared by admixing 100 grams of the prepolymer of Example V with a mixture of:
 (a) 40 grams of a resinous hydroxy material of the type prepared in Example IV having an OH value of 166.8 and a nitrogen content of 11.2 percent;
 (b) 72 grams of a resinous hydroxy material prepared from 1 mole of sucrose, 11 moles propylene oxide and 4 moles ethylene oxide, in the manner of Example II, and having a hydroxyl number of about 460 and a viscosity of about 25,000 centipoises;

(c) 1.0 gram of a polyoxyalkylene organo-siloxane copolymer emulsifier having the formula:

$$C_2H_5-Si\begin{pmatrix} O\left(-\underset{CH_3}{\overset{CH_3}{Si}O}-\right)_7(C_2H_4O)_{50}(C_3H_6O)_{50}(C_4H_9) \\ O\left(-\underset{CH_3}{\overset{CH_3}{Si}O}-\right)_7(C_2H_4O)_{50}(C_3H_6)_{50}(C_4H_9) \\ O\left(-\underset{CH_3}{\overset{CH_3}{Si}O}-\right)_7(C_2H_4O)_{50}(C_3H_6)_{50}(C_4H_9) \end{pmatrix}$$

(d) 31 grams of Refrigerant 11B (trichlorofluoromethane).

The isocyanate component was vigorously blended with other ingredients for about 20 seconds at about 70° F. and within 25 seconds thereafter a rigid foam having a strong gel had formed.

After curing for 60 hours at room temperature the foam had a fine cell structure and a density of 1.99 pounds per cubic foot. Upon subjection of 200° F. temperature for 48 hours, the foam remained hard, with very moderate distortion and with few internal and external splits.

The water vapor transmission character of the foam was tested by exposing one side of the foam to an atmosphere of 100 percent relative humidity and the other side of the foam to an atmosphere of 50 percent humidity. The water vapor transmission rate was 3.53 perm-inches.

The water absorptivity of the foam was 3.89 percent by weight as determined by immersing a sample of the foam in water for a period of 14 days and determining the weight increase.

Foams prepared in the above manner utilizing a benzoguanamine propylene oxide or melamine-propylene oxide reaction product as the additional resinous hydroxy-containing material have comparable properties.

EXAMPLE VII

A polyurethane foam was prepared by admixing 100 grams of a mixture of polyisocyanates having an average NCO content of 31 percent, an average equivalent weight of 135, and the following representative structure:

$$\left[\underset{NCO}{\phantom{X}}\bigcirc-\left[-CH_2-\bigcirc-\right]_n\underset{NCO}{\phantom{X}}\right]$$

where $n$ has an average value of 1.5, with a mixture of:

(a) 86 grams of a resinous hydroxp material prepared from 1 mole of sucrose, 11 moles of propylene oxide and 4 moles of ethylene oxide, in the manner of Example II, and having a hydroxyl number of about 460 and a viscosity of about 25,000 centipoises;

(b) 1.0 gram of a polyoxyalkylene organo-siloxane copolymer emulsifier having the formula:

$$C_2H_5-Si\begin{pmatrix} O\left(-\underset{CH_3}{\overset{CH_3}{Si}O}-\right)_7(C_2H_4O)_{50}(C_3H_6O)_{50}(C_4H_9) \\ O\left(-\underset{CH_3}{\overset{CH_3}{Si}O}-\right)_7(C_2H_4O)_{50}(C_3H_6)_{50}(C_4H_9) \\ O\left(-\underset{CH_3}{\overset{CH_3}{Si}O}-\right)_7(C_2H_4O)_{50}(C_3H_6)_{50}(C_4H_9) \end{pmatrix}$$

(c) 1.6 milliliters of a 1:0.4 blend of dimethylethanolamine and triethylenediamine catalysts; and (d) 31 grams of trichlorofluoromethane.

The isocyanate component was vigorously blended with the other ingredients for about 25 seconds at about 70° F. The initial stage of foaming occurred about 10 seconds after the agitation was stopped and within an additional 30 seconds a foam having a strong gel had formed.

After curing for 68 hours at room temperature the foam was rigid, having a fine cell structure and a density of 2.13 pounds per cubic foot. Upon subjection to 200° F. temperature for 48 hours the foam remained hard, undistorted and free from internal splits.

The water vapor transmission character of the foam was treated in the manner described in Example III. The water transmission rate was 4.57 perm-inches.

The water absorptivity of the foam was 2.68 percent by weight. This was determined by immersing a sample of the foam in water for a period of 14 days.

While specific examples of the invention have been set forth hereinabove, it is not intended to limit the invention solely thereto, but to include all of the variations and modifications falling within the scope of the appended claims.

We claim:

1. A rigid cellular polyurethane having predominantly closed cells comprising the reaction product of (a) an organic polyisocyanate, (b) a polyhydroxy resinous reaction product of an amino-s-triazine and a compound selected from the class consisting of an alkylene carbonate and an alkylene oxide, and (c) a blowing agent.

2. The cellular material of claim 1 wherein the organic polyisocyanate is selected from the class consisting of hexamethylene diisocyanate, tolylene diisocyanate, and an organic polyisocyanate having the structure $$\left[\underset{NCO}{\phantom{X}}\bigcirc-\left[-CH_2-\bigcirc-\right]_n\underset{NCO}{\phantom{X}}\right]$$

where $n$ is a number from 1.0 to 2.0.

3. The cellular material of claim 1 wherein the alkylene oxide is ethylene oxide.

4. The cellular material of claim 1 wherein the alkylene oxide is propylene oxide.

5. The cellular polyurethane of claim 1 wherein the closed cells contain a halohydrocarbon.

6. The cellular polyurethane of claim 1 wherein the polyhydroxy resinous reaction product has a minimum hydroxyl value of about 150.

7. The cellular polyurethane of claim 1 wherein the amino-s-triazine is selected from the class consisting of melamine and benzoguanamine.

8. A rigid cellular polyurethane having predominantly closed cells comprising the reaction product of (a) an organic polyisocyanate, (b) a polyhydroxy resinous reaction product of an amino-s-triazine and an alkylene carbonate, and (c) a blowing agent.

9. The cellular material of claim 8 wherein the amino-s-triazine has the structure $$\begin{array}{c} R' \\ | \\ C \\ N \diagup \diagdown N \\ \| \phantom{XX} \| \\ R''-C \phantom{X} C-NH-R \\ \diagdown \diagup \\ N \end{array}$$

wherein R is a member of the class consisting of hydrogen, alkyl and aryl groups and R' and R" are members of the class consisting of hydrogen, amino, alkylamino, arylamino, alkyl and aryl groups.

10. The cellular material of claim 9 wherein the alkylene carbonate is propylene carbonate.

11. The cellular material of claim 9 wherein the alkylene carbonate is ethylene carbonate.

12. The cellular polyurethane of claim 8 wherein the polyhydroxy resinous reaction product is a liquid.

13. A rigid cellular polyurethane having predominantly closed cells comprising the reaction product of (a) an organic polyisocyanate, (b) a liquid, polyhydroxy resinous reaction product of an amino-s-triazine and an alkylene carbonate selected from the class consisting of ethylene carbonate and propylene carbonate, and (c) a blowing agent.

(References on following page)

References Cited

UNITED STATES PATENTS

| | | | |
|---|---|---|---|
| 2,995,530 | 8/1961 | Frisch | 260—2.5 |
| 3,054,756 | 9/1962 | Holtschmidt et al. | 260—2.5 |
| 3,145,207 | 8/1964 | Wohnsiedler et al. | 260—249.6 |
| 3,216,975 | 11/1965 | Kunde et al. | 260—77.5 |
| 3,225,016 | 12/1965 | Reimschussel et al. | 260—78.4 |
| 3,244,713 | 4/1966 | Dowbenko et al. | 260—249.9 |
| 3,256,281 | 6/1966 | Kaiser et al. | 260—2.5 |
| 3,265,668 | 8/1966 | Dowbenko et al. | 260—2.5 |

DONALD E. CZAJA, *Primary Examiner.*

LEON J. BERCOVITZ, G. W. RAUCHFUSS, J. J. KLOCKO, *Assistant Examiners.*